(12) United States Patent
Belanger

(10) Patent No.: US 8,994,750 B2
(45) Date of Patent: Mar. 31, 2015

(54) CELL-BASED COMPOSITED WINDOWING SYSTEM

(75) Inventor: Etienne Belanger, Kanata (CA)

(73) Assignee: 2236008 Ontario Inc., Waterloo, Ontario (*) Notice: Subject to any disclaimer, the term of this patent is extended or adjusted under 35 U.S.C. 154(b) by 240 days.

(21) Appl. No.: 13/493,513

(22) Filed: Jun. 11, 2012

(65) Prior Publication Data

US 2013/0328922 A1 Dec. 12, 2013

(51) Int. Cl.
*G09G 5/00* (2006.01)
*G06T 11/00* (2006.01)

(52) U.S. Cl.
CPC .......... *G06T 11/00* (2013.01); *G09G 2340/10* (2013.01); *G09G 2340/12* (2013.01)
USPC ........................................ 345/629

(58) Field of Classification Search
None
See application file for complete search history.

(56) References Cited

U.S. PATENT DOCUMENTS

| | | | |
|---|---|---|---|
| 5,329,616 A | 7/1994 | Silverbrook | 395/164 |
| 5,867,166 A | 2/1999 | Myhrvold et al. | 345/419 |
| 5,870,097 A | 2/1999 | Snyder et al. | 345/426 |
| 5,886,701 A | 3/1999 | Chauvin et al. | 345/418 |
| 5,977,977 A | 11/1999 | Kajiya et al. | 345/418 |
| 6,020,894 A | 2/2000 | Silverbrook | 345/433 |
| 6,191,800 B1 | 2/2001 | Arenburg et al. | 345/505 |
| 6,252,608 B1 | 6/2001 | Snyder et al. | 345/473 |
| 6,292,194 B1 | 9/2001 | Powell, III | 345/430 |
| 6,674,430 B1 | 1/2004 | Kaufman et al. | 345/419 |
| 7,012,620 B1 | 3/2006 | Silverbrook | 345/619 |
| 7,034,845 B2 | 4/2006 | Perry et al. | 345/611 |
| 7,042,458 B2 | 5/2006 | Frisken et al. | 345/469 |
| 7,133,041 B2 | 11/2006 | Kaufman et al. | 345/419 |
| 7,190,367 B2 | 3/2007 | Perry et al. | 345/506 |
| 7,471,291 B2 | 12/2008 | Kaufman et al. | 345/424 |
| 8,125,495 B2 | 2/2012 | Darsa et al. | 345/592 |
| 8,159,505 B2 | 4/2012 | Cheng et al. | 345/629 |
| 8,405,679 B2 * | 3/2013 | Murtagh | 345/629 |
| 2005/0099434 A1 | 5/2005 | Gray et al. | 345/629 |
| 2006/0267993 A1 | 11/2006 | Hunkins et al. | 345/502 |
| 2008/0284798 A1 | 11/2008 | Weybrew et al. | 345/630 |
| 2009/0262122 A1 | 10/2009 | Darsa et al. | 345/545 |
| 2010/0058229 A1 | 3/2010 | Mercer | 715/788 |
| 2010/0079489 A1 | 4/2010 | Cheng et al. | 345/629 |

(Continued)

OTHER PUBLICATIONS

Compositing Window Manager, dated May 13, 2012, pp. 1-10, Wikipedia, available at http://en.wikipedia.org/wiki/Compositing.
European Search Report, dated Aug. 3, 2012, pp. 1-7, European Patent Application No. 12171544.5, European Patent Office, Germany.

*Primary Examiner* — Phi Hoang
*Assistant Examiner* — Mohammad H Akhavannik
(74) *Attorney, Agent, or Firm* — Brinks Gilson & Lione

(57) ABSTRACT

A system improves the performance of compositing individual images representing graphic layers into a composite image. The system may subdivide an image area of the composite image into cells such that for each one of the cells, either none of the graphic layers overlap within a respective one of the cells or all of the graphic layers that overlap within the respective one of the cells overlap throughout the respective one of the cells. A composition operation may be applicable to composite the respective one of the cells. The system may determine which processor generates the respective one of the cells based on which one of the processors is able to perform the type composition operation. The processor may generate the respective one of the cells by processing the composition operation.

15 Claims, 5 Drawing Sheets

(56) References Cited

U.S. PATENT DOCUMENTS

| | | | |
|---|---|---|---|
| 2011/0109642 A1 | 5/2011 | Chang et al. | 345/589 |
| 2011/0115792 A1 | 5/2011 | Tamaoki | 345/426 |
| 2011/0242114 A1* | 10/2011 | Blythe et al. | 345/505 |

* cited by examiner

CELL-BASED COMPOSITED WINDOWING SYSTEM

BACKGROUND

1. Technical Field

This disclosure relates to graphics and, in particular, to the composition of graphics buffers.

2. Related Art

Graphical user interfaces (GUI), Picture in Picture (PiP), and other types of graphical images may be composited from multiple independently rendered images. For example, a GUI may contain a background image and one or more rendered graphic layers on top of the background image. The graphic layers may comprise applications, task bars, or any other type of graphic elements. Each one of the graphic layers may be rendered independently of the other graphic layers by individual software applications. The graphic layers may then be composited together into a single graphic layer, or composited buffer, which may be presented on a display device, transmitted over a network, or otherwise processed.

BRIEF DESCRIPTION OF THE DRAWINGS

The disclosure may be better understood with reference to the following drawings and description. The components in the figures are not necessarily to scale. Moreover, in the figures, like-referenced numerals designate corresponding parts throughout the different views.

DETAILED DESCRIPTION

Figure 1:
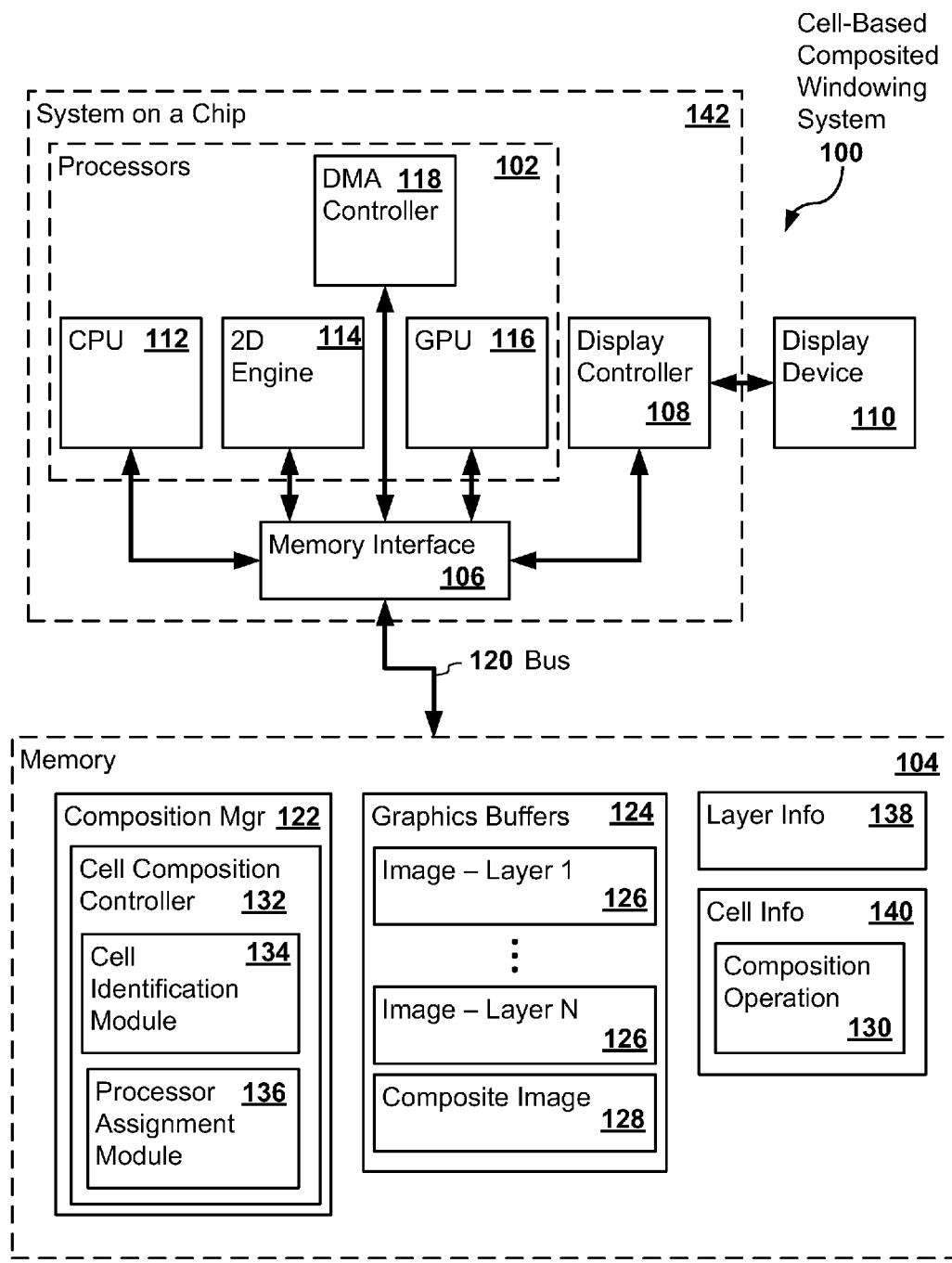
FIG. 1 illustrates a cell-based composited windowing system.

A cell-based composited windowing system may include processors, graphics buffers, a cell identification module, and a processor assignment module. The processors may include, for example, a CPU (central processing unit), a GPU (graphics processing unit), a 2D (two dimensional) engine, and/or a DMA (Direct Memory Access) controller. The graphics buffers may represent individual images to be composited into a composite image, where the individual images correspond to graphic layers arranged in a stack. The cell identification module and the processor assignment module may be, for example, part of a composition manager that generates the composite image.

The cell identification module may subdivide an image area of the composite image into cells such that for each one of the cells, a set of the graphic layers intersect a respective one of the cells, and each graphic layer in the set of the graphic layers intersects the respective one of the cells throughout the respective one of the cells. In other words, for each one of the cells, either none of the graphic layers overlap within the respective one of the cells or all of the graphic layers that overlap within the respective one of the cells overlap throughout the respective one of the cells.

The processor assignment module may determine, for each one of the cells, a composition operation to composite the set of the graphic layers that intersect the respective one of the cells. For example, the composition operation may be a blit (bit blit or bit-block transfer) operation or a multi-layer blend operation. The processor assignment module may also determine which processor will generate the respective one of the cells based on which processor is able to perform the respective composition operation. For example, the processor assignment module may determine that a two dimensional (2D) engine is to process the respective composition operation when the respective composition operation is either an opaque transaction type, such as a blit operation, or a two-layer blend operation, and a Graphics Processing Unit (GPU) is to process the respective composition operation when the respective composition operation is a multi-layer blend operation involving more than two of the graphic layers. The manner in which the processor assignment module determines the processor that is to process the composition operation is described in more detail below.

The processor that is determined by the processor assignment module may generate the respective one of the cells of the composite image. In particular, the cell may be generated by the processor executing the respective composition operation. If a combination of composition operations is needed for the composition of one of the cells, then one or more of the processors may execute the composition operations for the cell.

A single pass approach may generate each cell. The composition operation may make one or more reads of the individual images and one write to a buffer representing the composite image. Multiple read and/or writes to the composite image buffer when compositing any region within any cell may be unnecessary. For example, an opaque cell may be read from one of the graphic buffers once and written to the composite image buffer once. For any cell in which multiple graphic layers overlap, the composition operation may cause two or more reads from the individual images in the graphic buffers and a single write to the composite image buffer. In reading from and writing to the graphics buffers, the processors may use a substantial portion of the bandwidth of a bus connecting the processors with the memory. The system may decrease the amount of bandwidth of the bus that is consumed by the processors when updating the graphics buffers.

The cell-based composited windowing system may leverage modern GPU and 2D graphics engines. For example, standards like OPENGL® (Open Graphics Library) support multi-texturing, which provides an operation for reading multiple, individually rendered images and blending the individual images together in a single operation in which the composite image is written to the composite image buffer once (OPENGL® is a registered trademark of Silicon Graphics, Inc. of Mountain View, Calif.). The CPU or other processor may also support such standards. Accordingly, the GPU, the CPU, and/or the 2D graphics engine may provide a standards-based API (application programming interface) to perform cell compositing for blending cases. Each one of the cells may form a set of vertexes that may be filled in with rendered graphics, such as textures, during generation of the cells. Filling in areas described by vertexes maps well to many GPU architectures. 2D graphics engines may support operations like blits, blits with blending, and even blits with blending of multiple graphic layers in some examples. A DMA controller may also be programmed to perform operations such as blits. Accordingly, the 2D engine, the DMA controller, the GPU, and the CPU may support cell compositing.

Deciding which of the processors to use for compositing a cell may depend on the system because each system may be different. For example, some systems have a fast CPU with a relatively slow GPU, whereas other systems have a relatively fast GPU. Each cell may be rendered independently of the other cells so that each cell may be rendered by a selected one of the processors. For example, the DMA controller may fill the opaque cells with a blit operation and the GPU may composite the cells that require blending. Alternatively or in addition, composition of the cells in which the graphic layers are to be blended may be divided between the GPU and the 2D engine. In some implementations, one of the processors, such as the 2D engine, may consume less power than another one of the processors, such as the GPU. The processor that consumes less power than other processors may be selected when the processor is able to process the composition operation. Alternatively, or in addition, the processor that consumes less power may be selected when the load on that processor is below a threshold level. Alternatively or in addition, directing the first one of the processors to process a subset of the composition operations may reduce the chance of cache swapping (in other words, "thrashing") in the second processor. Any combination of processors and any rule for routing the composition operations to the processors may be included in the cell-based composited windowing system.

FIG. 1 illustrates a cell-based composited windowing system 100. The system 100 may include, for example, multiple processors 102, a memory 104, and a memory interface 106. The processors 102 may be any components that include hardware and/or a combination of hardware and software configured to modify memory. The memory may include the memory 104 illustrated in FIG. 1 or any other memory. The processors 102 may include a central processing unit (CPU) 112, a two dimensional (2D) engine 114, a graphics processing unit (GPU) 116, and/or a direct memory access (DMA) controller 118. The processors 102 may include additional, fewer, or different processors. Additional examples of the processors 102 include a blitter chip, a general processor, a multi-core processor, an application specific integrated circuit (ASIC), a digital signal processor, a field programmable gate array (FPGA), a digital circuit, an analog circuit, a microcontroller, any other type of processor.

The memory interface 106 may be any component that manages the transportation of data going to and from the memory 104, such as between the processors 102 and the memory 104. The memory interface 106 may be any memory controller, such as a Memory Chip Controller (MCC), a Double Data Rate2 (DDR2) memory controller used to drive DDR2 SDRAM (double data rate synchronous dynamic random-access memory), a Peripheral Component Interconnect (PCI) bus controller, or any other type of memory controller. The memory interface 106 may communicate with the memory 104 over a bus 120, such as a 64 bit DDR2 bus operating at 400 Megahertz or any other type of bus. One or more of the processors 102, such as the DMA controller 118, may be included in the memory interface 106.

The memory 104 may be any device for storing and retrieving data or any combination thereof. The memory 104 may include non-volatile and/or volatile memory, such as a random access memory (RAM), a read-only memory (ROM), an erasable programmable read-only memory (EPROM), or a flash memory. Alternatively or in addition, the memory 104 may include an optical, magnetic (hard-drive) or any other form of data storage device.

The memory 104 may store computer code, such as a composition manager 122. The computer code may include instructions executable with one or more of the processors 102. The computer code may be written in any computer language, such as C, C++, assembly language, shader code, channel program code, and/or any combination of computer languages.

The memory 104 may include graphics buffers 124. The graphics buffers 124 may include individual images 126 that represent graphic layers 210, such as the three graphic layers 210 illustrated in FIG. 2, which are individually designated A, B, and C, respectively. In particular, the images 126 may represent the graphic layers 210 that are to be composited into a composite image 128 stored in one or more of in the graphics buffers 124.

The composition manager 122 may be any component that composites or directs the composition of the individual images 126 into the composite image 128. The images 126 may include windows generated by a windows based operating system, such an operating system for a mobile electronic device, a desktop computer, or a server. Examples of the windows based operating system may include MICROSOFT WINDOWS®, which is a registered trademark of Microsoft Corporation of Redmond, Wash.; LINUX®, which is a registered trademark of Linus Torvalds of Finland; and ANDROID™, which is a trademark of Google, Inc. of Mountain View, Calif. Alternatively or in addition, any of the images 126 may include a task bar, a background picture, a frame in a sequence of frames in a video, or any other type of digital image.

Each one of the images 126 may represent a corresponding one of the graphic layers 210. The images 126, represented by the graphic layers 210, may have any size and may be arranged in any order and/or position. The graphic layers 210 may be arranged or stacked along a depth dimension so that when the composition manager 122 combines the graphic layers 210, the composition manager 122 forms the composite image 128 of the graphic layers 210 in multiple dimensions such as two dimensions. If the graphic layers 210 overlap, then the composition manager 122 may merge the overlapping portion or portions. The composite image 128 may have an image area 220 that is different from the sizes of the graphic layers 210 being composited. The graphic layer 210 or the graphic layers 210 may also be referred to as the layer 210 or the layers 210.

Figure 2:
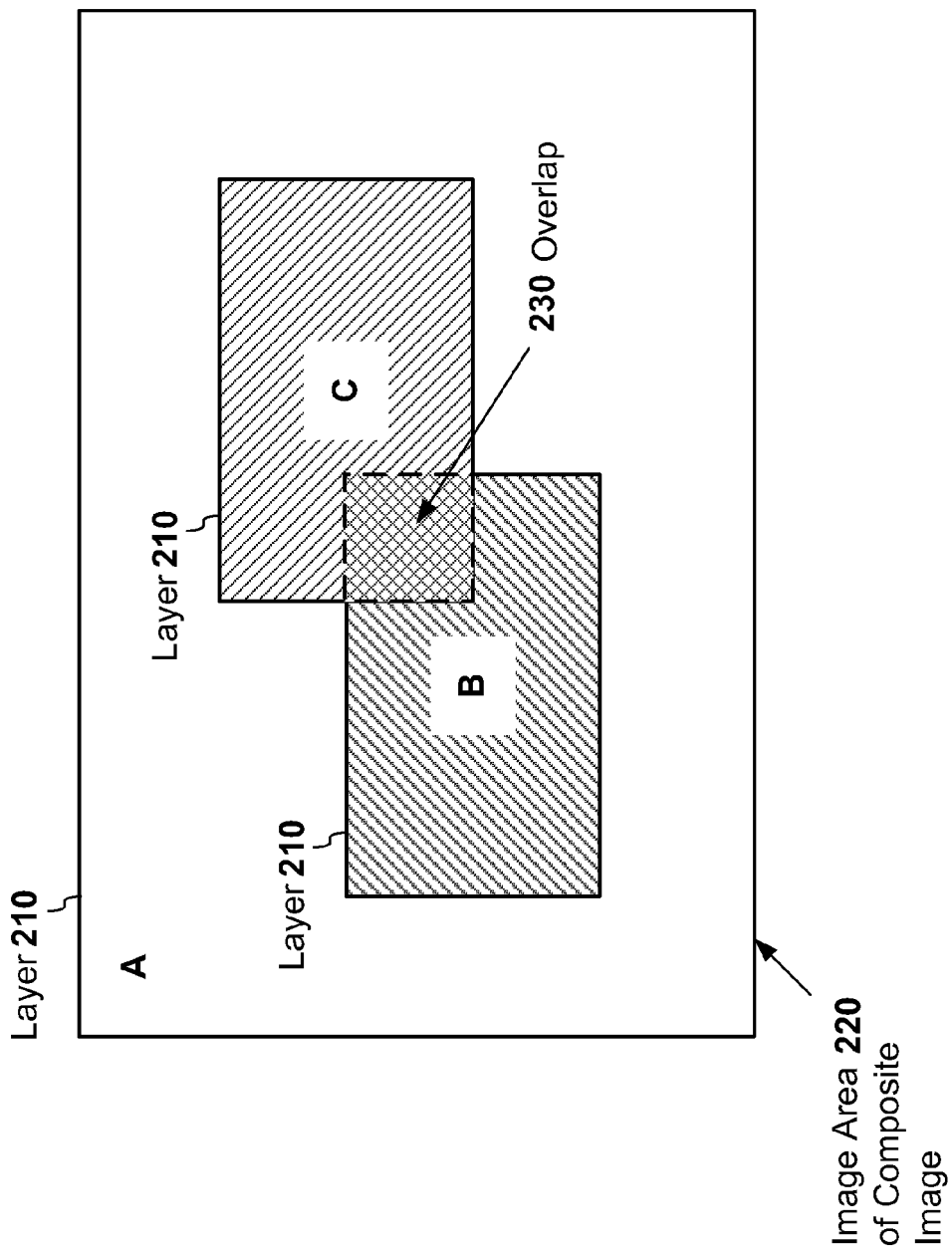
FIG. 2 illustrates individual images that represent graphic layers.

In FIG. 2, for example, layer A is the lowest layer 210, layer B is the next lowest layer 210, and layer C is the highest layer. Layer A has the same size as the image area 220 of the composite image 128. Layers B and C are smaller than the image area 220 of the composite image 128. All of layers B and C overlap layer A. A portion 230 of layer C overlaps layer B.

During operation of the cell-based composited system 100, the composition manager 122 may combine or merge the images 126 representing the layers 210 into the composite image 128. In particular, the composition manager 122 may merge the layers 210 by subdividing the image area 220 of the composite image 128 into cells 310, assigning each one of the cells 310 to a corresponding one of the processors 102, and processing each cell 310 with the corresponding assigned processor 102.

Figure 3:
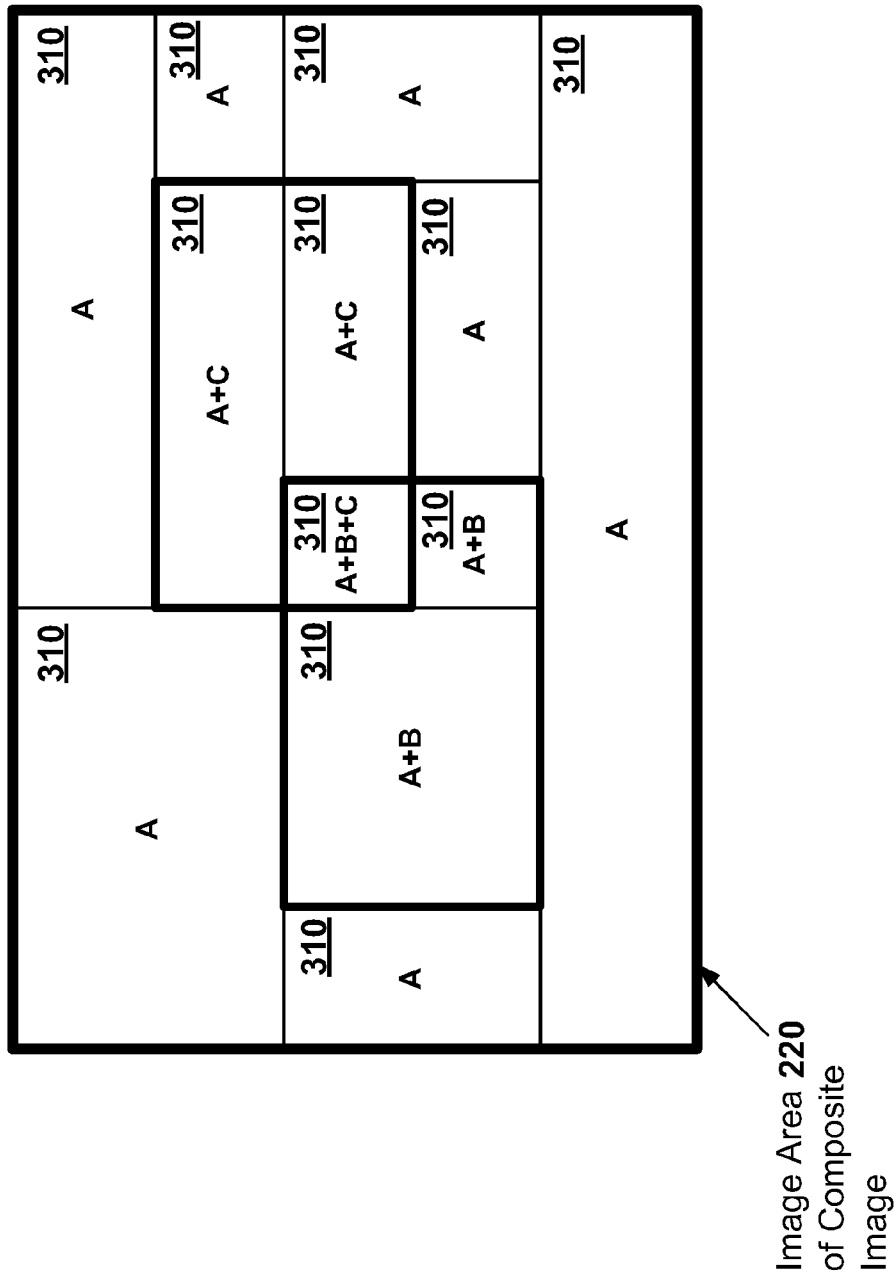
FIG. 3 illustrates an image area of a composite image that is subdivided into cells.

FIG. 3 illustrates the image area 220 of the composite image 128 of FIG. 2 subdivided into cells 310. The composition manager 122 may subdivide the image area 220 of the composite image 128 into the cells 310 such that, in each one of the cells 310, any one portion of the cell 310 is to be composited from the same set of the layers 210 as any other portion of the cell 310. In other words, either none of the layers 210 overlap within a respective one of the cells 310 or the layers 210 that overlap within the respective one of the cells 310 all overlap throughout the respective one of the cells 310.

FIG. 3 illustrates the image area 220 of the composite image 128 of FIG. 2 subdivided into the cells 310. The composition manager 122 may size and position each one of the cells 310 so that any portion within the cell 310 is to be composited from an identical set of the layers 210 as any other portion within the cell 310. For example, the cells 310 illustrated in FIG. 3 are individually designated A, A+B, A+C, and A+B+C, respectively. The cells 310 designated A are to be composited only from layer A. The cells 310 designated A+B are to be composited only from layer A and layer B because layer A and layer B overlap throughout the cells 310 designated A+B. The cells 310 designated A+C are to be composited from only layer A and layer C because layer A and layer C overlap throughout the cells 310 designated A+C. The cell 310 designated A+B+C is to be composited from layer A, layer B, and layer C because layer A, layer B, and layer C overlap throughout the cell 310.

The composition manager 122 may arrange the cells 310 differently than illustrated in FIG. 3. For example, two or more of the cells 310 may be combined to form one cell. In one such example, the cells 310 that are designed A in FIG. 3 may be combined to form one cell. The cells 310 may have a rectangular shape as illustrated in FIG. 3, or any other shape.

The composition manager 122 may composite each of the cells 310 from the set of the layers 210 in a manner that may depend on whether the respective one of the cells 310 intersects just one of the layers 210 and/or based on how the layers 210 that overlap within the respective one of the cells 310 are to be combined. For example, if the cell 310 intersects just one of the layers 210, then the cell 310 in the composite image 128 may be generated by a blit operation, which may comprise a memory copy operation. The blit operation may copy memory from the graphics buffer 124 that includes the intersected layer 210 to the graphics buffer 124 that includes the composite image 128. Alternatively, if the cell 310 intersects multiple layers 210 and a top one of the intersected layers 210 obscures the remaining intersected layers 210, then the cell 310 in the composite image 128 may be generated by a blit operation. For example, the blit operation may copy memory from the graphics buffer 124 that includes the top layer 210 to the graphics buffer 124 that includes the composite image 128. Alternatively or in addition, if the cell 310 intersects two layers 210 and the top layer 210 is transparent, then then the cell 310 in the composite image 128 may be generated by a blit operation that copies memory from the graphics buffer 124 that includes the bottom layer 210 to the graphics buffer 124 that includes the composite image 128. Alternatively, if the cell 310 intersects multiple layers 210 and the top layer 210 is semitransparent, then the multiple layers 210 may be blended with a blending operation, such an alpha blending operation.

Thus, the composition manager 122 may composite each one of the cells 310 based on what type of a composition operation 130 is applicable to the set of layers 210 that intersect the cell 310. The type of the composition operation 130 may be any type of operation that may generate the cell 310 of the composite image 128. The composition operation 130 may blend or copy pixel information or any other representation of image data. Examples of the type of the composition operations 130 include an opaque transaction type, a blended transaction type, or any other type of operation.

The opaque transaction type may be a type of an operation that generates the cell 310 from one of the layers 210. Examples of the composition operations 130 that are of the opaque transaction type include a single texture fill and a source/destination blit operation. The source/destination blit operation may copy memory from one buffer to another.

The blended transaction type may be a type of operation that generates the cell 310 from a combination of two or more of the layers 210. Examples of the composition operations 130 that are of the blended transaction type include a multi-layer blend operation, a two-layer blend operation, a multi-texture standard command, a blit with blend or multi-source blend, or any other type of composition operation 130. The two-layer blend operation may blend two of the layers 210. The multi-layer blend operation may blend any number of the layers 210.

The composition operations 130 may include one or more commands that may be completed by one or more of the processors 102. The composition operations 130 may be in a graphics language, such as OPENGL®, a registered trademark of Silicon Graphics, Inc. of Mountain View, Calif. Alternatively or in addition, the composition operations 130 may be in any other suitable language, such as in input/output commands for DMA controllers. Alternatively or in addition, the composition operations 130 may be executed by invoking a procedural call in an API (application programming interface).

Each one of the processors 102 may be able to perform one or more types of the composition operations 130. For example, the DMA controller 118 may be able to perform the composition operations 130 that are the opaque transaction type, but not the blended transaction type. The 2D engine 114 may be able to perform the blit operations and the two-layer blend operations, but not the multi-layer blend operations where more than two of the layers 210 are to be blended. The GPU 116 may be able to perform both the opaque transaction type and the blended transaction type. Alternatively, the DMA controller 118, the 2D engine 114, and the GPU 116 may be able to perform different types of composition operations 130.

The composition manager 122 may determine which of the processors 102 is to process the composition operation 130 for each one of the cells 310. The composition manager 122 may route the composition operation 130 for each one of the cells 310 to a corresponding one of the processors 102 that has the ability to process the composition operation 130.

The composition manager 122 may route the composition operation 130 to the corresponding one of the processors 102 in many ways. For example, the composition manager 122 may pass an instruction or code to the processor 102. For example, the composition manager 122 may pass the composition operation 130 in the form of shader code to the GPU 112. Alternatively or in addition, the composition manager 122 may invoke an API to direct the processor 102 to perform the composition operation 130. For example, the 2D engine 114 may accept a blit command. However, rather than passing the 2D engine the blit command, the composition manager 122 may determine what memory should be copied where in order to complete the blit command, and pass a corresponding copy command directly to the DMA controller 118 to be processed.

The composition manager 122 may apply one or more rules when routing the composition operations 130 to the processors 102. A rule may be to direct a first one of the processors 102 to process one or more types of the composition operations 130, and to direct a second one of the processors 102 to process any other type of the composition operations 130. For example, a rule may be to direct the 2D engine 114 to the process the blit operations and/or the two-layer blend operations, and to direct the GPU 116 to process multi-layer blend operations that blend more than two of the layers 210.

A rule may route the composition operations 130 to a main one of the processors 102, but if the main processor 102 is busy, then route the composition operations 130 to a second one of the processors 102. For example, a rule may direct the GPU 116 to process the composition operations 130 when a load on the GPU 116 is below a threshold level, and direct the CPU 112 and/or the 2D engine 114 to process the composition operations 130 when the load on the GPU 116 is above the threshold level. Alternatively or in addition, a rule may route the composition operations 130 to a least loaded one of the processors 102 that is capable of processing the composition operation 130. The load level of one or more of the processors 102 may be available to the composition manager 122 for applying one or more of the rules for routing the composition operations 130.

As discussed, the composition manager 122 may direct a corresponding one of the processors 102 to composite each one of the cells 310 with the composition operations 130. Each one of the cells 310 may be composited independently of the other cells 310. The cells 310 may be composited in parallel. For example, a first one of the processors 102 may composite a first one of the cells 310 while a second one of the processors 102 composites a second one of the cells 310. The first one of the processors 102 may composite the first one of the cells 310 by processing the composition operation 130 for the first one of the cells 310. At the same time, the second one of the processors 102 may composite the second one of the cells 310 by processing the composition operation 130 for the second one of the cells 310. If the processors 102 include the CPU 112, the 2D engine 114, and the GPU 116, for example, then the processors 102 may composite three of the cells 310 in parallel: each one of the CPU 112, the 2D engine 114, and the GPU 116 may composite a corresponding one of the three cells 310.

Referring to FIG. 1, the composition manager 122 may include a cell composition controller 132 that handles tasks related to the cells 310. The cell composition controller 132 may include a cell identification module 134 and a processor assignment module 136.

The cell identification module 134 may identify the cells 310 by subdividing the image area 220 of the composite image 128 into the cells 310. The cell identification module 134 may use any number of mechanisms for subdividing the image area 220. For example, the cell identification module 134 may use a bottom up or a top down mechanism where the cells 310 are identified as each of the layers 210 is applied. For example, in the bottom up mechanism, the cell identification module 134 may start with the bottom layer 210 and iteratively apply each successive one of the layers 210 until the top layer 210 is reached, identifying the cells 310 on each iteration. In the example illustrated in FIG. 2, the cell identification module 134 may start with layer A, which is a rectangle that covers the image area 220 of the composite image 128. The cell identification module 134 may apply layer B, which is a rectangle enclosed by layer A. The cell identification module 134 may provisionally identify the cells 310 as comprising five cells: the rectangle that is layer B; and four rectangular cells that surround layer B, which together, cover the portion of layer A not covered by layer B. The cell identification module 134 may then apply layer C, which is a rectangle that overlaps layer B and which is enclosed by layer A. The cell identification module 134 may identify the cells 310 as the cells illustrated in FIG. 3 by overlaying the rectangle that is layer C onto the five cells identified when layer B was applied.

The cell identification module 134 may use layer information 138 stored in the memory 104 to identify the layers 210. The layer information 138 may include information about each one of the layers 210, such as the size and position of each of the layers 210, and an alpha value and/or opaqueness value for each one of the layers 210. The cell identification module 134 may generate cell information 140 that includes information about each one of the cells 310. The cell information 140 may include the size and position of the cell 310. The cell information 140 may include more, less, or different information. For example, the cell information 140 may include the composition operation 130 or the composition operations 130 to composite the cell 310, the type of composition operation 130 to composite the cell 310, and/or any other information applicable to the cell 310.

The processor assignment module 136 may determine which of the processors 102 is to composite each respective one of the cells 310 as described herein. The processor assignment module 136 may determine the assigned processor 102 for each one of the cells 310 from the layer information 138 and/or the cell information 140. For example, the processor assignment module 136 may determine the composition operation 130 for each one of the cells 310 by determining which of the layers 210 intersect the cell 310 from the cell information 140, and then determine how the layers 210 are to be combined from the properties of the layers 210 as indicated in the layer information 138. The processor assignment module 136 may also composite each respective one of the cells 310 with the determined one of the processors 102 by providing the composition operation 130 for the respective one of the cells 310 to the determined one of the processors 102.

Figure 4:
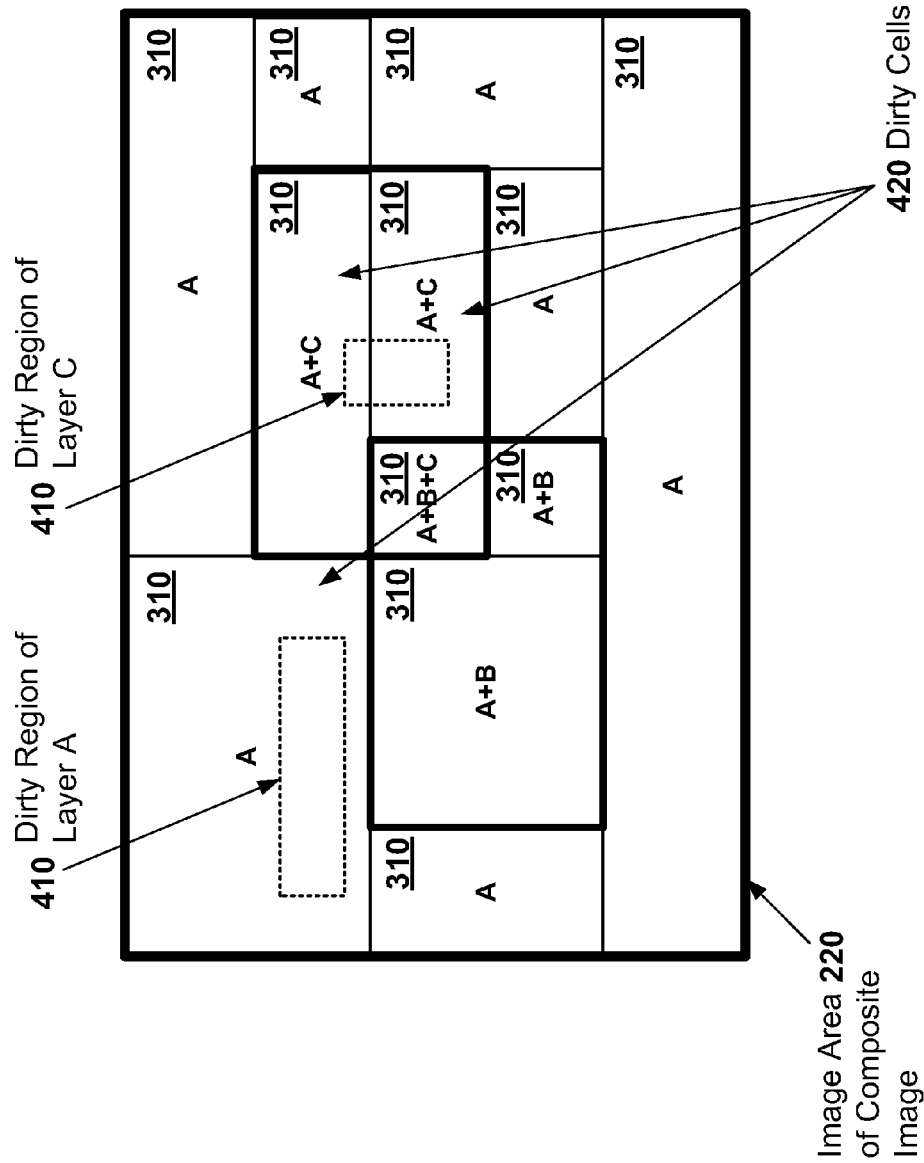
FIG. 4 illustrates dirty regions of individual images that intersect cells.

In some embodiments, the system 100 may keep track of dirty regions 410 of the individual images 126 represented in the layers 210. FIG. 4 illustrates the dirty regions 410 of the individual images 126. The dirty regions 410 in each of the images 126 may identify what portion of each individual image 126 changed from a first frame to a second frame. When updating the individual images 126 in the graphics buffers 124 to the second frame, the system 100 may limit the updates to the portions of the individual images 126 included within the dirty regions 410.

The processor assignment module 136 may determine which of the cells 310 of the composite image 128 intersect the dirty regions 410 of the individual images 126. The cells 310 that intersect the dirty regions 410 of the individual images 126 being composited may be referred to as dirty cells 420. For example, in FIG. 4, the dirty regions 410 intersect the cells 310 designated A+C and the cell 310 in the upper left corner of the image area 220 designated A. The processor assignment module 136 may direct the processors 102 to composite the dirty cells 420, but skip compositing the cells 310 that are not the dirty cells 420.

All of the disclosure, regardless of the particular implementation described, is exemplary in nature, rather than limiting. The cell-based composited windowing system 100 may include additional, fewer, or different components than illustrated in FIG. 1. For example, the system 100 may include a display controller 108 and a display device 110. The display controller 108 may read the composite image 128 from the memory 104 through the memory interface 106 and cause the composite image 128 to be displayed in the display device 110.

Furthermore, each one of the components of the cell-based composited windowing system 100 may include more, fewer, or different elements than is illustrated in FIG. 1. For example, the memory 104 may include more, fewer, or different modules, graphics buffers, and applications. Moreover, the various modules are but one example of such functionality and any other configurations of modules encompassing similar functionality are possible. The cell composition controller 132, for example, may be included in a different component than the composition manager 122. In another example, one or more of the features of the cell identification module 134 may be implemented in a different module. Flags, data, databases, tables, entities, and other data structures may be separately stored and managed, may be incorporated into a single memory or database, may be distributed, or may be logically and physically organized in many different ways. The components may operate independently or be part of a same program. The components may be resident on separate hardware, such as separate removable circuit boards, or share common hardware, such as a same memory and processor for implementing instructions from the memory. Programs may be parts of a single program, separate programs, or distributed across several memories and processors.

In some examples, one or more of the components of the system 100 may be included in a System on a Chip (SOC) 142. For example, the SOC 142 may include the processors 102, the memory interface 106 and the display controller 108. In another example, the SOC 142 may include additional components, such as memory. Some implementations of the SOC 142 may include a 2D engine that has different features than other implementations of the SOC 142. In other implementations of the SOC 142, the SOC 142 may not include the 2D engine 114.

The system 100 may include a configuration file that identifies multiple types of systems and/or types of systems on a chip. The configuration file may also identify the types of processors in each of the identified systems. During operation of the system 100, the system may look up the system 100 and/or the SOC 142 in the configuration file and identify the processors 102 and/or the types of the processors 102 available in the system 100 from the configuration file. The processor assignment module 136 may determine the processor 102 to process the composition operation 130 based on a lookup of the identity of the SOC 142 in a configuration file, where the SOC 142 comprises at least one of the processors 102. For example, the configuration file may indicate what types of the composition operations 130 the processors in the SOC 142 are able to process.

The system 100 may be implemented in many different ways. For example, although some features are shown stored in computer-readable memories as logic implemented as computer-executable instructions or as data structures in memory, portions of the system 100 and its logic and data structures may be stored on, distributed across, or read from any other machine-readable storage media. Examples of the media may include memories, a cache, a buffer, RAM, a removable media, a hard drive, hard disks, floppy disks, CD-ROMs, or any other type of machine-readable or computer-readable storage medium. The media may include any non-transitory computer-readable storage media, such as CD-ROMs, volatile or non-volatile memory such as RAM and ROM, any other suitable storage device or any combination thereof. Alternatively or in addition, features and/or modules described as logic implemented as computer-executable instructions or as data structures in memory may be implemented in hardware or in a combination of hardware and software, such as in a field programmable gate array (FPGA).

As one example, each one of the processors 102 may be implemented as a microprocessor, a microcontroller, a DSP (digital signal processor), an application specific integrated circuit (ASIC), a field programmable gate array (FPGA), a digital circuit, an analog circuit, discrete logic, any other type of circuit or logic, or any combination thereof. As another example, the memory 104 may include non-volatile and/or volatile memory, such as a random access memory (RAM), a read-only memory (ROM), an erasable programmable read-only memory (EPROM), flash memory, any other type of memory now known or later discovered, or any combination thereof. The memory 104 may include an optical, magnetic (hard-drive) or any other form of data storage device.

The functions, acts or tasks illustrated in the figures or described may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

The processing capability of the system 100 may be distributed among multiple entities, such as among multiple processors and memories, optionally including multiple distributed processing systems. Parameters and other data structures may be separately stored and managed, may be incorporated into a single memory or database, may be logically and physically organized in many different ways, and may be implemented with different types of data structures such as linked lists, hash tables, or implicit storage mechanisms. Logic, such as programs or circuitry, may be combined or split among multiple programs, distributed across several memories and processors.

Figure 5:
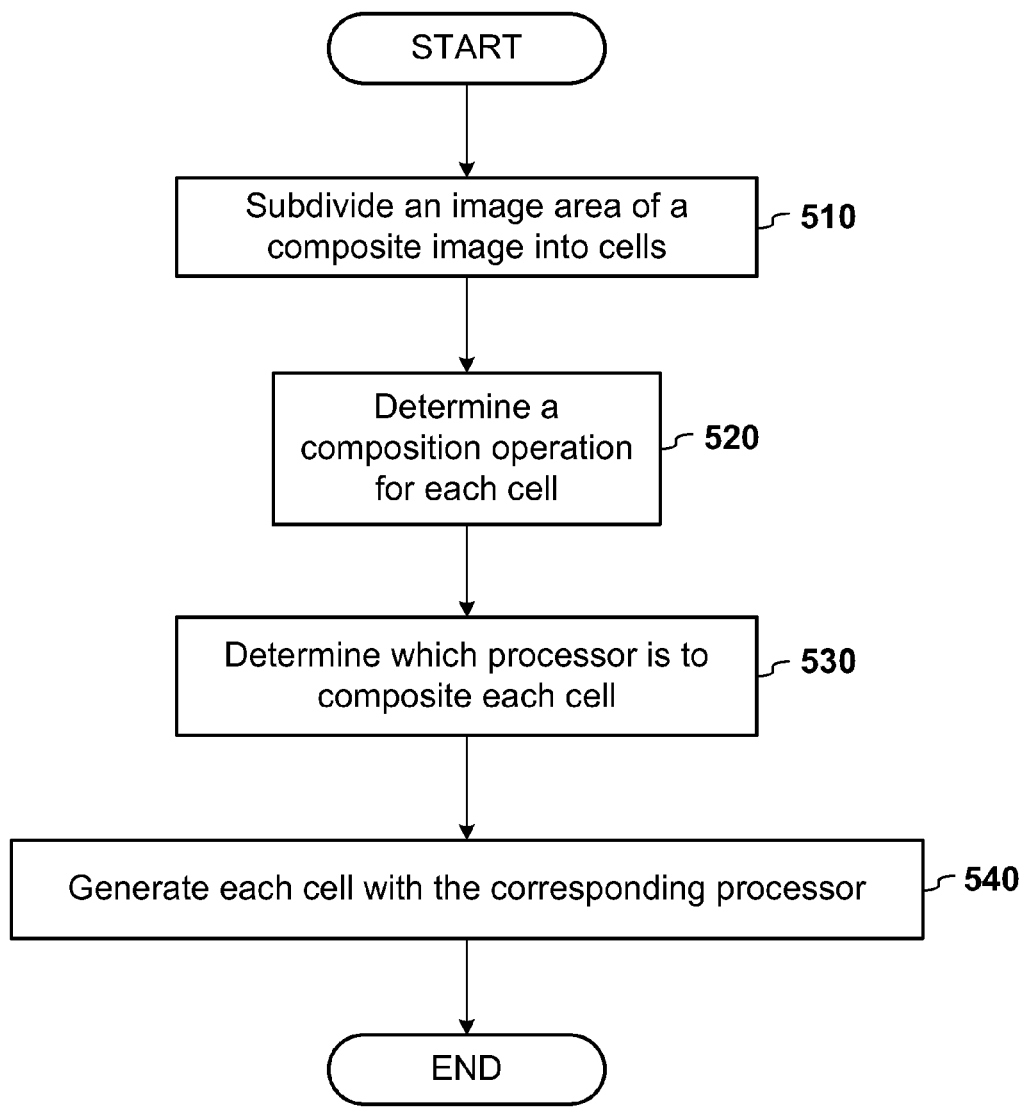
FIG. 5 illustrates a flow diagram of the logic of a cell-based composited windowing system.

FIG. 5 illustrates a flow diagram of the logic of the cell-based composited windowing system 100. The graphics buffers 124 that represent the individual images 126 may be provided, where the individual images 126 represent the graphic layers 210 to be composited into the composite image 128. For example, the memory 104 may include the graphics buffers 124.

The logic may start by subdividing (510) the image area 220 of the composite image 128 into the cells 310 such that for each one of the cells 310, either none of the graphic layers 210 overlap within a respective one of the cells 310 or all of the graphic layers 210 that overlap within the respective one of the cells 310 overlap throughout the respective one of the cells 310. Any number of algorithms may be used to subdivide the image area 220 into the cells 310.

The composition operation 130 may be determined (520) for each of the cells 310. The composition operation 130 may be applicable to composite a set of the graphic layers 210 that intersect the respective one of the cells 310.

For each of the cells 310, a determination may be made (530) as to which of the processors 102 is to generate the respective one of the cells 310 based on which of the processors 102 is able to perform the type of the composition operation 130. The respective one of the cells 310 of the composite image 128 may be generated (540) from the set of the graphic layers 210 that intersect the cell 310. In particular, each cell 310 may be generated by performing the respective composition operation 130 with the processor 102 that was determined to be the processor 102 to generate the cell 310. The logic may end, for example, by displaying the composite image 128 or otherwise reading the composite image 128 from the graphics buffers 124.

The logic may include additional, different, or fewer operations. For example, the logic may limit the cells 310 that are composited to the cells 310 that intersect the dirty regions 410 of the individual images 126. The operations may be executed in a different order than illustrated in FIG. 5.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While various embodiments have been described, it will be apparent to those of ordinary skill in the art that many more embodiments and implementations are possible within the scope of the disclosure. Accordingly, the disclosure is not to be restricted except in light of the attached claims and their equivalents.

What is claimed is:

1. A computer implemented method of compositing multiple images, comprising:
    providing a plurality of graphics buffers representing a plurality of application windows rendered by an application, wherein the rendered application windows represent a plurality of graphic layers to be composited into a composite image;
    subdividing an image area of the composite image into a plurality of cells such that for each one of the cells, either none of the graphic layers overlap within a respective one of the cells or all of the graphic layers that overlap within the respective one of the cells overlap throughout the respective one of the cells;
    determining, for each one of the cells, a respective composition operation applicable to composite a set of the graphic layers that intersect the respective one of the cells;
    determining, for each one of the cells, which of a plurality of processors is to generate the respective one of the cells based on which of the processors is able to perform the type of the respective composition operation; on the graphic layers that intersect the respective one of the cells, the graphic layers representative of the rendered application windows; and
    compositing the rendered application windows by generating the cells with the processors, each respective one of the cells of the composite image generated from the set of the graphic layers that intersect the respective one of the cells by performing the respective composition operation with a processor determined to be one of the processors to generate the respective one of the cells.

2. The computer implemented method of claim 1, wherein determining which of the processors is to generate the respective one of the cells further comprises determining that a first one of the processors is to process the respective composition operation when the respective composition operation is a first type of composition operation, and a second one of the processors is to process the respective composition operation when the respective composition operation is a second type of composition operation.

3. The computer implemented method of claim 1, wherein determining which of the processors is to generate the respective one of the cells further comprises determining the processor to process the respective composition operation by selecting the processor from a group of the processors that comprises at least two of a Direct Memory Access (DMA) controller, a Graphics Processing Unit (GPU), a two dimensional (2D) engine, or a Central Processing Unit (CPU).

4. The computer implemented method of claim 1, wherein determining which of the processors is to generate the respective one of the cells further comprises determining that a two dimensional (2D) engine is to process the respective composition operation when the respective composition operation is an opaque transaction type, and a Graphics Processing Unit (GPU) is to process the respective composition operation when the respective composition operation is a blended transaction type.

5. The computer implemented method of claim 1, wherein determining which of the processors is to generate the respective one of the cells further comprises determining that a two dimensional (2D) engine is to process the respective composition operation when the respective composition operation is either an opaque transaction type or a two-layer blend operation, and a Graphics Processing Unit (GPU) is to process the respective composition operation when the respective composition operation is a multi-layer blend operation involving more than two of the graphic layers.

6. The computer implemented method of claim 1, wherein determining which of the processors is to generate the respective one of the cells further is also based on whether a load on at least one of the processors exceeds a threshold value.

7. The computer implemented method of claim 1, wherein generating the respective one of cells of the composite image comprises at least two of the processors generating at least two of the cells of the composite image in parallel.

8. A system for compositing multiple images, the system comprising:
    a plurality of processors; and
    a memory comprising:
        a plurality of graphics buffers representing a plurality of individual images, wherein the individual images represent a plurality of graphic layers to be composited into a composite image;
        a cell identification module executable with at least one of the processors to subdivide an image area of the composite image into a plurality of cells such that for each one of the cells, a set of the graphic layers intersect a respective one of the cells, and each one of the graphic layers in the set of the graphic layers intersects the respective one of the cells throughout the respective one of the cells; and
        a processor assignment module executable with the at least one of the processors to determine, for each one of the cells, a respective composition operation to composite the set of the graphic layers that intersect the respective one of the cells,
    wherein the processor assignment module is further executable to determine that, for each one of the cells, a determined one of the processors is to generate the respective one of the cells based on a determination of which of the processors is able to perform the respective composition operation on the graphic layers that intersect the respective one of the cells, the graphic layers including application windows rendered by applications, and wherein the processor assignment module is further executable to direct at least two of the processors to generate the cells, wherein each of the cells of the composite image is generated by the determined one of the processors through an execution of the respective composition operation by the determined one of the processors, and the execution of the respective composition operation composites a portion of the graphic layers, including the rendered application windows, that intersect the respective one of the cells.

9. The system of claim 8, wherein the processor assignment module is further executable to determine which of the cells of the composite image intersect any of a plurality of dirty regions of the individual images, wherein the dirty regions of the individual images identify which portions of the individual images have changed.

10. The system of claim 9, wherein the processor assignment module is further executable to direct the processors to generate the cells of the composite image that intersect any of the dirty regions of the individual images, but not to direct the processors to generate the cells of the composite image that fail to intersect any of the dirty regions of the individual images.

11. The system of claim 8, wherein the processor assignment module is further executable to determine that the determined one of the processors is a first one of the processors when the respective composition operation is a first type of composition operation, and the determined one of the processors is a second one of the processors when the respective composition operation is a second type of composition operation.

12. The system of claim 8, wherein the processor assignment module is further executable to determine that the determined one of the processors is one of the processors that consumes less power than the other processors.

13. The system of claim 8, wherein the processor assignment module is further executable to determine the determined one of the processors based on a lookup of an identification of a system on a chip in a configuration file, and the system on a chip comprises at least one of the processors.

14. The system of claim 8, wherein the processor assignment module is further executable to determine that the determined one of the processors is a graphics Processing Unit (GPU) when a load on the GPU is below a threshold level, and the determined one of the processors is a Central Processing Unit and/or a two dimensional (2D) engine when the load on the GPU is above the threshold level.

15. A non-transitory computer-readable storage medium encoded with computer executable instructions, the computer executable instructions executable with a processor to composite multiple images, the computer-readable storage medium comprising:

instructions executable to provide a plurality of graphics buffers representing a plurality of individual rendered application windows, wherein the individual rendered application windows represent a plurality of graphic layers to be composited into a composite image;

instructions executable to subdivide an image area of the composite image into a plurality of cells such that for each one of the cells, either none of the graphic layers overlap within a respective one of the cells or all of the graphic layers that overlap within the respective one of the cells overlap throughout the respective one of the cells;

instructions executable to determine, for each one of the cells, a respective composition operation applicable to composite a set of the graphic layers that intersect the respective one of the cells;

instructions executable to determine which of a plurality of processors is to generate the respective one of the cells based on which of the processors is able to perform the type of the respective composition operation; and instructions executable to generate each respective one of the cells of the composite image from the set of the graphic layers that intersect the respective one of the cells through execution of the respective composition operation with a processor determined to be one of the processors to generate the respective one of the cells, wherein each of the processors is determined to be one of the processors to generate at least one of the cells of the composite image.

* * * * *